Patented June 5, 1928.

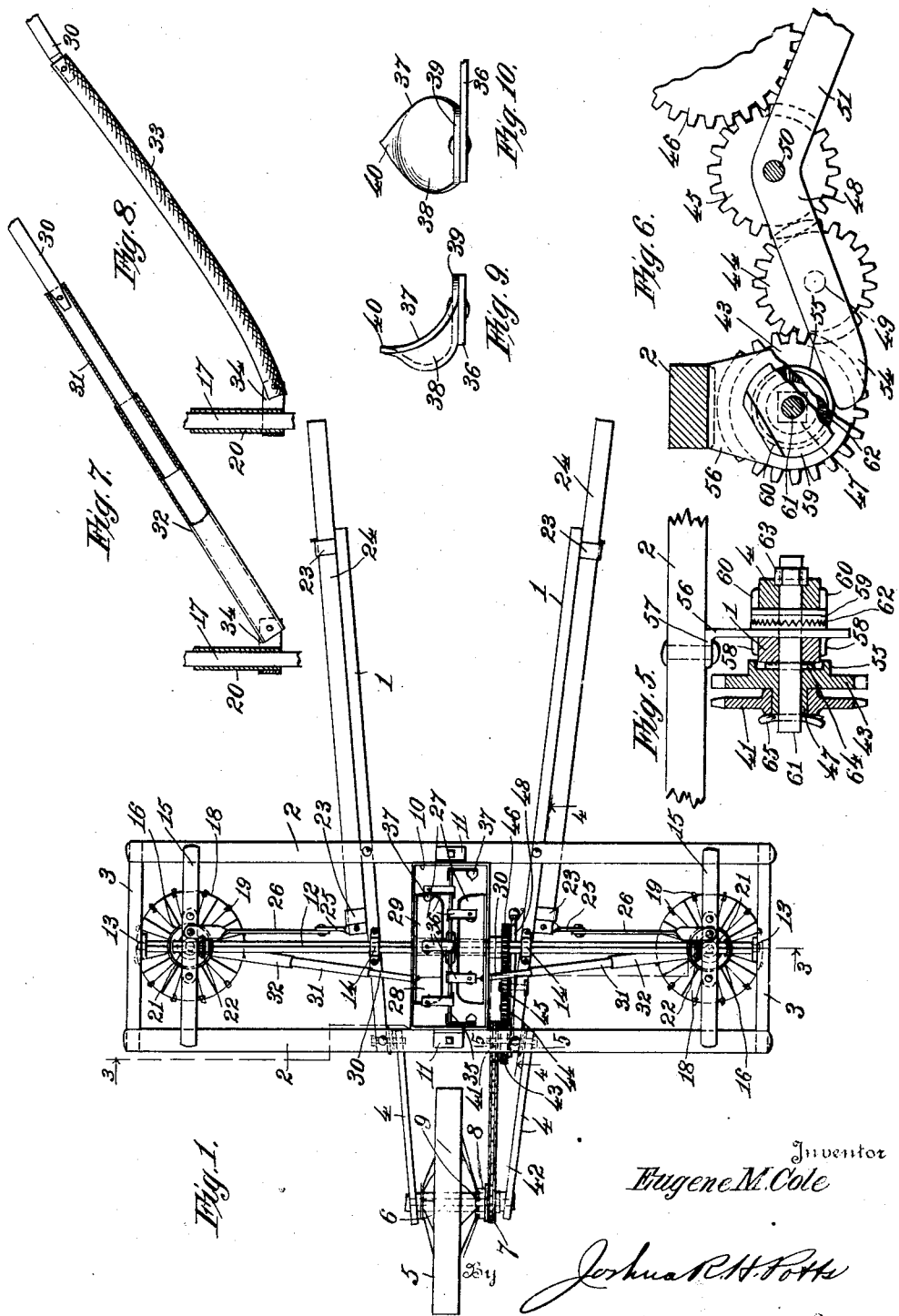

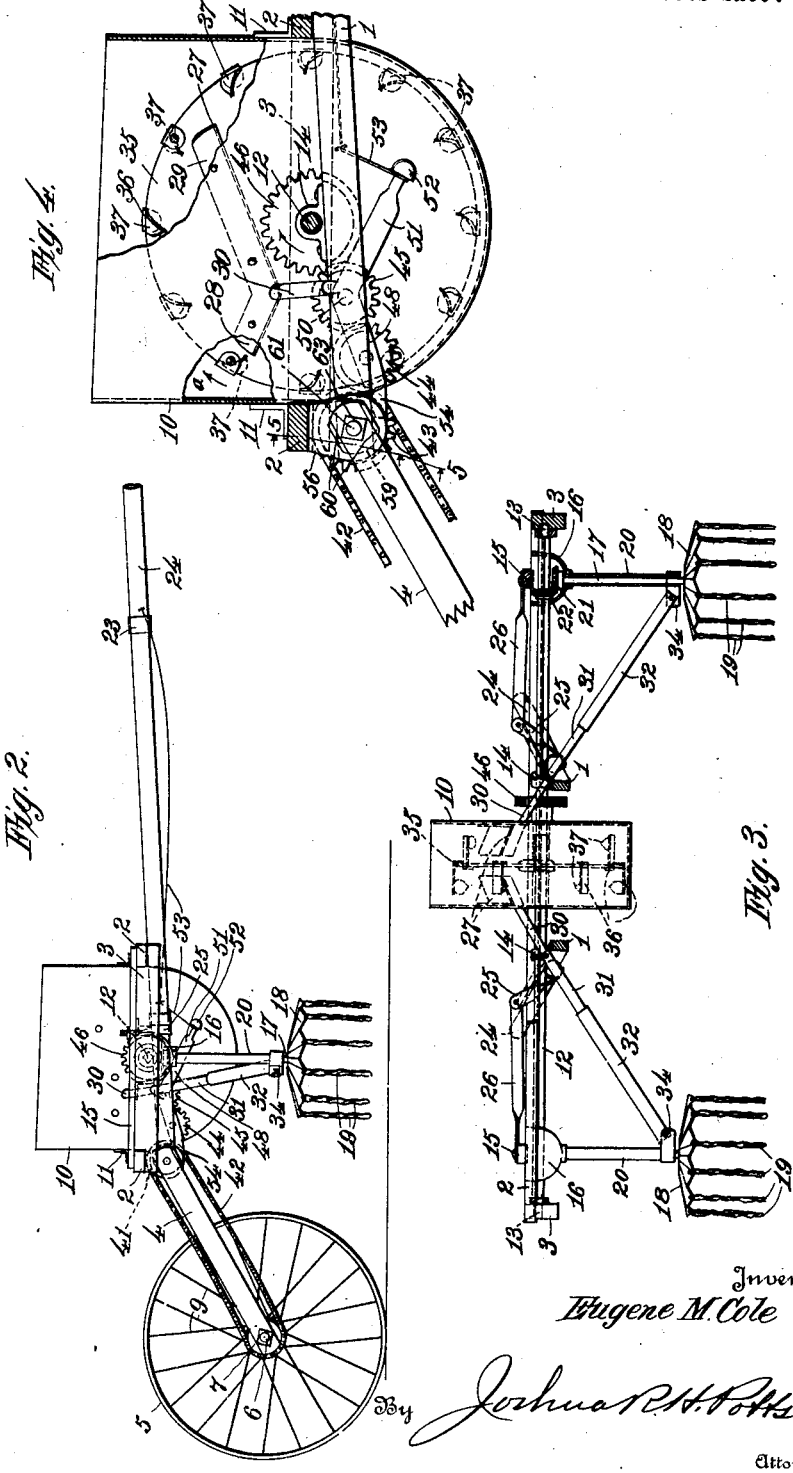

1,672,058

UNITED STATES PATENT OFFICE.

EUGENE M. COLE, OF CHARLOTTE, NORTH CAROLINA.

INSECTICIDE-APPLYING MACHINE.

Application filed January 12, 1924. Serial No. 685,760.

My invention relates to insecticide applying machines and particularly to machines for applying insecticide or the like to the plants of field and garden crops.

The object of my invention is to provide an improved insecticide applying device which will apply a liquid insecticide to the plants uniformly and in predetermined quantities. A further object of my invention is to provide a device as mentioned which will effectually apply the insecticide to the plants without the usual large percentage of loss of insecticide as is common with spraying devices.

In carrying out my invention I provide a suitable wheeled frame, a reservoir for the liquid insecticide, wipers for engaging the plants and applying the insecticide thereto and means for feeding the insecticide to the wipers in measured quantities. By the term "insecticide" I mean to include any material used for treating plants such as insecticides, fungicides, and the like. These substances are usually mixed with a liquid, such as water, and to secure the best results constant agitation is necessary to keep a uniform mixture.

A further object of my invention is to provide in a device of the class mentioned, means for keeping the insecticide agitated to insure the application of the same in uniform strength to the plant.

A further object of my invention is to provide means whereby the wipers may be adjusted transversely of the frame to accommodate the device to plants in rows of different widths, and whereby either or both wipers may be instantly adjusted to treat a plant, even when out of alinement in the row. A further object of my invention is to provide in a device of the class mentioned means for adjusting the height of the wipers to accommodate plants of different heights. Other objects will appear hereinafter.

With these objects in view my invention consists generally in a frame, a reservoir carried thereby, a wiping device adapted to engage the plants and supported by said frame, and means for supplying insecticide to said wiping device from said reservoir. My invention further consists in a device as mentioned in which the insecticide is supplied to the wiping device in measured quantities. My invention further consists in a device as mentioned in which the wiping device comprises a rotary distributing member and a plurality of depending wipers thereto, said wipers being of suitable flexible material so as to engage the plants and apply the insecticide thereto without injuring the same. My invention further consists in a device as mentioned in combination with means whereby the wiping device may be instantly moved toward or from the reservoir. My invention further consists in a device as mentioned in combination with a suitable duct leading from the reservoir to the distributing member and means for feeding the insecticide through said duct in predetermined quantities. My invention further consists in a device as mentioned in which said feeding device also constitutes means for agitating the material in the reservoir. My invention further consists in various details of construction and arrangements of parts all as will be fully described hereinafter and particularly pointed out in the claims.

My invention will be more readily understood by reference to the accompanying drawing and in which—

Fig. 1 is a plan view of an insecticide distributor device embodying my invention in its preferred form, Fig. 2 is a side elevation thereof, Fig. 3 is a front elevation partially in section, the section being taken on line 3—3 of Fig. 1, Fig. 4 is a section on the line 4—4 of Fig. 1 upon an enlarged scale, Fig. 5 is a detailed section on the line 5—5 of Figs. 1 and 4 upon an enlarged scale, portions being shown in elevation, Fig. 6 is a detail view of a portion of the gearing, Fig. 7 is a detail view upon an enlarged scale of the conduit from the reservoir of one of the wipers, Fig. 8 is a similar view of a modified form of the same, Fig. 9 is a side elevation of one of the elevator cups and Fig. 10 is a front view of the same.

Referring now to the drawings 1—1 indicate longitudinal members of the frame which are preferably rearwardly divergent to properly space the handles as will appear hereinafter.

At their forward ends the bars 1 are rigidly connected by the transverse frame portion which comprises a pair of parallel bars 2—2 connected at their outer ends by bars 3—3. Pivotally connected to the forward bar 2 in a manner hereinafter described is a pair of downwardly and forwardly extending bars 4—4 between the forward ends of which is mounted a wheel 5 for supporting the forward end of the device. The wheel 5 is mounted upon an axle 6 which connects the forward ends of the members 4, and a spocket wheel 7 is mounted upon said axle, and is provided with a notch flange 8 which engages the spokes 9 of the wheel to rotate the spocket therewith. This construction is not essential to the invention, as any means may be employed for rotating the sprocket 7 with the wheel 5.

10 indicates the reservoir for the insecticide. This is mounted between the bars 2—2 of the transverse frame portion, being supported in any suitable manner as by brackets 11. The bottom of the reservoir is preferably semi-cylindrical for a purpose hereinafter mentioned. Extending transversely of the device is a shaft 12 having end bearings 13 in the frame members 3. This shaft, with the exception of its end bearings, is preferably square throughout its length and extends through the reservoir 10. If preferred, bearing blocks 14 for the shaft may be provided on the longitudinal frame members 1. Slides are mounted adjacent each end of the transverse frame portion, and these comprise bars 15 having their ends resting on the transverse members 2, and depending housings 16 through which the shaft 12 extends, both sides of the housing being apertured to permit the shaft to pass freely therethrough. Depending from each of the housings 16 is a wiping device which comprises a vertical shaft 17, a distributor wheel 18 and a plurality of wiping fingers 19. A tubular bearing 20 for the shaft 17 depends from the housing 16 and terminates slightly above the distributor wheel 18. The upper end of the shaft 17 within the housing 16 is provided with a beveled gear 21 which meshes with a beveled gear 22, which is slidably mounted on the square shaft 12. It is obvious that as the shaft 12 rotates, the wiping device will be rotated, and also that the wiping device may be moved toward or from the reservoir as desired without stopping the rotation of the wipers.

The lateral movement of the wiping device is effected by the following means: Rotatably mounted in cuffs 23 on the frame members 1 are handle bars 24, and fixed to the forward ends of the handle bars are crank arms 25 which are connected by links 26 to the bars 15. It is obvious that by this construction, the wiping devices may be moved laterally by a slight turn of the handle bars. The wiping devices may, therefore, be readily brought into contact with every plant in the row even though some of the plants may be out of alinement with the others in the row.

The distributing wheel 18 of the wiping device comprises a disc formed with a plurality of radially disposed corrugations, which constitute outwardly and downwardly inclined gutters for the insecticide. The wiping fingers 16 are secured to the wheel, preferably at the outer or lower ends of the gutters, as shown clearly in the drawings, and are preferably of suitable fabric so as to receive the poison and apply the same to the plants by direct contact with the same without injury thereto.

Suitable means must be employed for supplying the insecticide to the distributor wheels in the proper quantities. To this end a receiving trough is provided together with means for depositing therein a constant and measured supply of insecticide from the reservoir; and a duct leads from the receiving trough to a point above the distributor wheel. As shown in the drawings, I provide two receiving troughs 27, one for each wiping device, arranged upon the inner faces of the side walls of the reservoir. These are each preferably V-shaped having a shorter receiving end 28 to receive the greater part of the insecticide, and a longer portion 29 to receive the drip as will appear hereinafter. From the bottom of the trough, a spout 30 leads outwardly through the side of the reservoir, and extending from the end of the spout is the insecticide duct leading to the distributor wheel. This may consist of a pair of telescopic tubular members 31—32 as illustrated in Figs. 1 to 4 and Fig. 7 of the drawings, or may comprise a flexible tube 33 as illustrated in Fig. 8. In either event, the upper end of the duct is attached to the spout 30 and the lower end is attached to a clip 34 secured to the lower end of the bearing sleeve 20. By this arrangement, the insecticide is discharged upon an upper face of the distributor wheel near the center thereof and as said distributor wheel rotates, a uniform quantity of the insecticide passes down the corrugations to the several wiping fingers 16. The telescopic members 31—32 or the flexible tube 33 permits of the lateral adjustment of the wiping devices above described.

Arranged centrally within the reservoir, upon the shaft 12 is a wheel or disc 35 around the periphery of which are laterally extending arms 36. These are preferably arranged to extend alternately on opposite sides of the disc and upon their ends are arranged cups 37 for elevating the insecticide and depositing the same in the trough 27. The form of the cups is most clearly illustrated in Figs. 9 and 10 of the drawings. Each cup comprises a bowl shaped portion 38 having a flat side 39 for attachment to the arms 36, and terminating on the opposite side in a pointed pouring lip 40. Referring to the drawings, particularly Fig. 4, it will be noted that as the disc 35 rotates in the direction of the arrow a, the insecticide will be lifted by the cups 37 and poured into the short end of the receiving trough 27, and as the cups pass over the trough any remaining drip will fall into the long arm of the trough. This particular form of cup insures a complete emptying of the same in the receiving troughs, thereby insuring a constant and uniform supply of the insecticide to the wipers.

Mounted upon the frame of the device is a sprocket wheel 41 connected by a sprocket chain 42 to the sprocket wheel 7 hereinbefore described. The sprocket wheel 41 is connected to a gear 43 which is connected through pinions 44 and 45 with a gear 46 on the shaft 12. This constitutes the means for driving the shaft 12 and rotating the wipers. In the preferred construction, the gear wheel 43 is provided with a squared hub 47 upon which the sprocket wheel 41 is mounted. In order to throw the device into and out of operative relation, the pinions 44 and 45 are mounted upon a bar 48, which is pivoted to the adjacent frame member 1. The pinion 44 is mounted upon a stud 49 on said bar, and the stud shaft upon which the pinion 45 is mounted constitutes a pivot pin 50 for the bar. The bar 48 is provided with a downwardly and rearwardly extending arm 51 having a weighted head 52 which tends to keep the pinion 44 in mesh with the gear 43. A cable 53, or equivalent means, connected to the arm 51 provides means for raising said arm and throwing the pinion 44 out of engagement with the gear 43 to stop the operation of the device. In order to maintain the pinion 44 and gear 43 in proper relation when the machine is in operation and prevent jamming of the gears, the arm 48 is extended as at 54 to engage a flange 55 formed on the side of the gear 43.

To regulate the height of the device so as to adapt the same to plants of different heights, means are provided for adjusting the wheel supporting bars 4. To this end, pivotally connected members are attached to the frame and the bars 4 respectively, and are provided with interlocking corrugated faces to hold the same in adjusted position. The member on the frame comprises a depending bracket 56 having a flange 57 providing means for securing the same to the frame member 2, and flanges 58 to engage the upper and lower faces of the bar 1. The member attached to the bar 4 comprises a member 59 having flanges 60 engaging opposite faces of said bar. 61 indicates a bolt pivotally connecting said members. The adjacent faces of the members 56 and 59 are provided with interlocking corrugations 62. It is obvious that by loosening the nut 63 of the bolt 61 the bars 4 may be adjusted to the desired angle and then by tightening the bolt the corrugated faces will hold the same in proper relation. In practice, I extend one of the bolts 61 to form a shaft for the gear 43 and sprocket wheel 41. This construction is shown clearly in Fig. 5 of the drawings. As shown therein a headless pivot bolt is provided and equipped with a pin 64 engaging the outer face of the bar 1. The gear and sprocket wheel are held on the bolt by a cotter pin 65. By this arrangement the bolt serves the double purpose of a pivot pin for the wheel bars 4 and as a shaft for the gear and sprocket; and furthermore, the adjustment of the bars 4 may be made without interfering with the gearing.

In using the device the same is passed between the rows of plants and the cups 37 supply a continuous and measured quantity of insecticide to the troughs 27 from which it passes through the telescopic or flexible duct to the distributor wheels 18 of the wiping devices. The latter are continuously rotated in the manner above described and as the insecticide drops upon the upper face thereof, it is distributed uniformly to the wiping fingers through the corrugations in the upper face of the distributor wheel. By simply turning the handle bars, the wipers may be moved inwardly or outwardly as found necessary to accommodate plants in rows of different widths or the adjustment may be made instantly to supply the insecticide to a plant which may be out of alinement in the row. It is obvious that the rotary device for elevating and supplying insecticide to the receiving troughs will also serve as an agitator to keep the insecticide thoroughly and uniformly mixed. It is for this reason that the bottom of the reservoir is semi-cylindrical and coaxial with the shaft 12. The quantity of insecticide to be supplied to the wipers may be regulated either by varying the number of elevating cups 37, by varying the size of the cups, or by varying the size of the sprocket gear 41. The manner in which the sprocket wheel is mounted permits ready interchange of wheels of various sizes.

I claim:

1. A device for applying liquid insecticide to plants comprising a frame, a reservoir carried by said frame, a wiping device adapted to engage the plants and comprising a rotary distributor wheel and a plurality of strips of fabric depending from said wheel and means for supplying insecticide to said distributor wheel from said reservoir, substantially as described.

2. In an insecticide applying device, a rotary distributor wheel provided with radially disposed channels, depending wiping fingers secured to said wheel and adapted to receive the insecticide from said channels and means for supplying insecticide to said wheel, substantially as described.

3. In a device of the class described, a frame wheel supported at its forward end, rotatable handle bars, extending rearwardly on said frame, a pair of plant wiping devices carried by said frame, an insecticide reservoir, means for supplying insecticide to said wiping devices from said reservoir, and a connection between said handle bars and said wiping devices respectively, whereby rotation of the former will move said wiping devices laterally, as and for the purpose specified.

4. In a device of the class described, a frame comprising longitudinal members, wheels supported at the forward ends thereof, handle bars extending rearwardly therefrom, and parallel transverse frame bars, in combination with a pair of wiping devices slidably mounted on said transverse bars, means connecting said handle bars and said wiping devices whereby rotation of the former will move the wiping devices laterally, a reservoir and means for supplying insecticide to said wiping devices from said reservoir, substantially as described.

5. In a device as set forth in claim 4 in which each of said wiping devices comprises a bar having its ends slidably mounted on said transverse frame bars, a housing carried by said bar, a rotary shaft depending from said housing, a distributor wheel on said shaft and wiping fingers depending from said distributor wheel, substantially as described.

6. A device of the class described comprising a suitable frame, a wheel supporting the forward end of said frame, a transverse shaft, suitable gearing for connecting said wheel and shaft for rotating the latter, a reservoir, a wiping device comprising a slide, a housing thereon, a rotary shaft depending from said housing and wiping fingers carried thereby, said transverse shaft extending through said housing, a bevelled gear in said housing slidably mounted on said transverse shaft and a bevelled gear meshing therewith and fixed to said depending shaft of the wiping device, means for moving said wiping device laterally, and means for supplying liquid from said reservoir to said wiping device, substantially as described.

7. A device as set forth in claim 6 in which the transverse shaft extends through said reservoir, a duct leading from said reservoir to said wiping device and means on said shaft within said reservoir for supplying the insecticide to said duct in constant predetermined quantities, substantially as described.

8. In a device of the class described, a wiping device comprising a substantially vertical shaft, a distributor wheel, at lower end of said shaft and wiping fingers on said distributor wheel, a sleeve for said shaft, a reservoir, a duct leading from said reservoir, means on the lower end of said sleeve for supporting the end of said duct above said distributor wheel, and means for supplying insecticide to said duct in predetermined measured quantities, substantially as described.

9. A device of the class described comprising a frame, a wiping device and reservoir carried by said frame, a rotary device for supplying insecticide from said reservoir to said wiping device, a wheel for supporting the forward end of said frame, and arm for said wheel, a pivotal connection between said arm and frame, said connection comprising a bracket fixed to the frame, a cooperating member fixed to said arm, and a pivot bolt extending through said bracket and member, the adjacent faces of said bracket and said member being provided with interlocking corrugations, a sprocket wheel and a gear rotatably connected and mounted upon said bolt, a sprocket gear connected to said frame supporting wheel, a chain connecting said sprocket wheels and gearing connecting said gear wheel and said rotary device, substantially as described.

In testimony whereof I have signed my name to this specification.

EUGENE M. COLE.